Patented Apr. 27, 1954

2,676,954

UNITED STATES PATENT OFFICE 2,676,954

MODIFIED METHYL METHACRYLATE AND PROCESS OF MODIFYING THE SAME

George Kirkegaard, New York, N. Y., assignor of ten per cent to Leo C. Krazinski, New York, N. Y.

No Drawing. Application July 15, 1950, Serial No. 174,135

1 Claim. (Cl. 260—89.5)

The present invention relates to acrylic resins, and, more particularly, relates to modified methyl methacrylate or the like and a process of modifying the same.

Acrylic resins, usually sold under the trade name of "Lucite" or "Plexiglas," have been used extensively for many purposes where it is desirable to take advantage of their decorative water-white clarity or their light transmitting properties. However, one disadvantage of these materials is that they have relatively poor abrasive resisting properties upon being subjected to abrasive action, the surface thereof being easily scratched with resultant impairment to clarity and light transmission.

I have discovered that such resins, particularly methyl methacrylate, can be modified to greatly enhance their abrasive resisting characteristics without affecting their other desirable properties.

Accordingly, an object of the present invention is to provide a simple, economical process of so modifying methyl methacrylate.

Another object is to provide such a process which can be carried on with readily available equipment and a small quantity of low cost additive material.

Another object is to provide modified methyl methacrylate in partially polymerized state which thereafter can be further polymerized in any desired conventional manner.

A further object is to provide a modified methyl methacrylate resin in its polymerized state which is characterized in that its resistance to abrasion is about four times as great as unmodified methyl methacrylate resin polymerized in the same manner and in that its white light transmitting property is about the same as that of the unmodified resin.

A still further object is to provide such a resin which can be used for all the purposes to which the like unmodified resin is adapted.

Other and further objects will be obvious upon an understanding of the illustrative embodiment about to be described, or will be indicated in the appended claim, and various advantages not referred to herein will occur to one skilled in the art upon employment of the invention in practice.

In accordance with the invention, I have found that the foregoing objects can be accomplished by admixing alum with substantially liquid monomeric methyl methacrylate and then removing the unabsorbed alum from the mixture. Preferably, the alum is added to the methyl methacrylate in its substantially unpolymerized or monomeric state while agitating the mixture, and applying heat to effect partial polymerization. The unabsorbed alum, preferably, is removed by filtering the mixture. The resulting modified methyl methacrylate may be used without further treatment for various purposes or may be further polymerized to adapt it for other uses as will become apparent hereinafter.

The methyl methacrylate to be modified in practicing the invention preferably is in its pure unpolymerized or monomeric state. Such material is a clear colorless liquid with a boiling point of about 212° F. and a specific gravity of about 0.936. This invention may also be practiced by treating slightly or partially polymerized methyl methacrylate, provided that this material is sufficiently fluid to facilitate agitation thereof in a manner to admix the alum and to enable the mixture to be readily filtered. However, the unpolymerized or monomeric material is preferred to expedite filtering thereof, although the present invention is not intended to be limited thereto.

By the term "alum" is meant any of the commercial aluminum sulfates, either singly or combined. The use of anhydrous aluminum sulphate, $Al_2(SO_4)_3$, is preferred, although other low cost alums, such as aluminum sulfate crystals, $$Al_2(SO_4)_3 \cdot 9H_2O$$

or $Al_2(SO_4)_3 \cdot 18H_2O$, ammonium aluminum sulfate, $(NH_4)_2SO_4 \cdot Al_2(SO_4)_3 \cdot 24H_2O$, sodium aluminum sulfate, $Na_2SO_4 \cdot Al_2(SO_4)_3 \cdot 24H_2O$, or potassium aluminum sulfate $$K_2SO_4 \cdot Al_2(SO_4)_3 \cdot 24H_2O$$

may be employed to carry out the process.

The ratio of the amount of alum to the amount of methyl methacrylate used does not appear to be too critical. Best results are attained by admixing at least as much alum as the methyl methacrylate is capable of absorbing. Amounts of alum in excess of this produce equally good results because the alum in excess of that absorbed remains in its solid state and can be removed by filtering. However, it will be appreciated that amounts of alum greatly in excess of that required are not as desirable because the excess alum is wasted and filtering or removal thereof otherwise becomes more difficult. In practice, it has been found that about one part by weight of alum is sufficient to treat between about twelve and about twenty parts of monomeric methyl methacrylate.

The following examples illustrate the process in accordance with the invention.

*Example I*

One ounce of anhydrous aluminum sulfate powder was added to twelve ounces of liquid unpolymerized or monomeric methyl methacrylate contained in a glass jar at room temperature while agitating the liquid to effect admixture of the alum therein. The mixture was then filtered through filter paper whereby a slight excess of alum which appeared to be in dispersed suspension in the liquid was removed. The filtered liquid was as clear and colorless as the liquid at the start of the process.

*Example II*

The same procedure set forth in Example I was followed except that one ounce of anhydrous aluminum sulphate powder was added to twenty ounces of liquid monomeric methyl methacrylate. After adding the alum to the monomeric liquid, the jar was placed in a hot water bath at a temperature of about 200° F. and maintained therein for a period of about one half hour while continuing agitation of the mixture. At the end of the half hour period, it appeared that the absorption of alum by the methyl methacrylate had stopped, thus indicating that the latter had absorbed all the alum it possibly could. The initially liquid material now was somewhat more viscous which indicated that partial polymerization had taken place. The mixture was then filtered whereby the excess alum was removed. The filtered liquid was again as clear and colorless as the monomeric liquid at the start of the process.

*Example III*

A glass jar containing twenty ounces of liquid monomeric methyl methacrylate was placed in a hot water bath at a temperature of about 200° F. and the contents were agitated until the liquid monomer attained a temperature of almost 200° F. One ounce of anhydrous aluminum sulphate powder was added while continuing agitation for about ten minutes. This treatment appeared to cause the alum to be absorbed somewhat more rapidly than in the preceding example while simultaneously effecting slight partial polymerization. The treated liquid methyl methacrylate was then filtered to remove the excess alum therefrom.

The modified liquid methyl methacrylate prepared in accordance with any of the examples herein may be then converted to the solid resin, without or with the addition of about 1% or 2% of a suitable catalyst, such as hydrogen peroxide, sodium peroxide or benzoyl peroxide, by the application of heat to effect complete polymerization. In order to accomplish this, about two tenths of an ounce of benzoyl peroxide was admixed with ten ounces of the material prepared in accordance with Example II, and heat was applied to convert the liquid-like material to a viscous casting syrup. A circular shallow mold having a five inch diameter was filled with a portion of this syrup, the filled mold was heated by a hot water bath until the contents solidified, and the cast five inch disc was removed from the mold. This disc was crystal clear and appeared to have the same white light transmitting properties as a six inch square of about the same thickness as that of the disc formed of unmodified methyl methacrylate resin.

The disc of modified resin and the square of unmodified resin were forwarded for testing to a disinterested material testing laboratory, and tests were made on an abrasion (wear) test machine. The two specimens were successively clamped to a movable carriage, and were placed in constant contact with a lever arm covered with fine Aloxite cloth and exerting a pressure of approximately 33 ounces or 1.03 pounds per square inch.

The disc of modified resin was given 200 single strokes by this machine, and the square of unmodified resin was given 50 single strokes by this machine. The specimens were examined after being subjected to this test, and it was found that the square showed as much wear at 50 strokes as the disc showed at 200 strokes, thereby indicating that the modified resin had about four times the resistivity to abrasive action as the unmodified resin.

The resin formed in accordance with the invention may be reduced to a powder which is adapted to be molded into articles in the same manner as unmodified methyl methacrylate resin powders are molded, however, with the advantage that the modified resin will produce articles more highly resistive to abrasive action. The powder may also be dissolved in organic, so called lacquer solvents such as ethylene dichloride, ethyl acetate, toluene or the like to provide materials suitable for surface coatings which will be more abrasion resistive than coatings heretofore containing the unmodified resin.

Also, the unpolymerized modified methyl methacrylate prepared in accordance with Example I herein, as well as the partially polymerized modified methyl methacrylate prepared in accordance with Examples II and III, may be used to impregnate wood, cloth, cork, paper or ceramic material, and may be then polymerized to form the resin. The materials so impregnated will have a surface which is highly resistive to abrasive action.

While the present invention has been described in connection with the modification of monomeric methyl methacrylate which is the most extensively commercially manufactured ester of methacrylic acid, it will be appreciated that the invention is also applicable in the modification of other monomeric methacrylic acid esters which are adapted to be polymerized to form resins.

From the foregoing description, it will be seen that the present invention provides very useful modified methyl methacrylate and the like, and a simple economical process of producing the same. The modified materials are adapted to be used advantageously for casting or molding sheets, articles or the like, for providing surface coatings or adhesives and for impregnating porous materials. In each instance, a much harder and tougher wear resisting surface is provided, whereby fewer surface scratches will occur which would impair the ornamental or light transmitting qualities.

It will be understood that the details and examples hereinbefore set forth are illustrative only and that the invention as broadly described and claimed is in no way limited thereby.

I claim:

The process of making a modified methyl methacrylate resin which process comprises heating between about twelve and about twenty parts by weight of methyl methacrylate in substantially liquid monomeric state to about 200° F., adding about one part by weight of alum powder to the heated liquid, maintaining said temperature of 200° F. while agitating the liquid to admix the alum therein and to cause the alum to be absorbed, thereby effecting slight partial polymerization of the methyl methacrylate, filtering the mixture to remove unabsorbed alum therefrom, and converting the mixture to a resin, which resin is characterized in that its resistance to abrasion is about four times as great as a similar resin prepared in the identical manner but not treated with alum as aforesaid and in that its white light transmitting property is about the same as that of such untreated resin.

References Cited in the file of this patent

UNITED STATES PATENTS

| Number | Name | Date |
|---|---|---|
| 2,129,668 | Barrett et al. | Sept. 13, 1938 |
| 2,129,690 | Hill | Sept. 13, 1938 |
| 2,462,354 | Brubaker et al. | Feb. 22, 1939 |